United States Patent
Dyott

[11] 3,930,714
[45] Jan. 6, 1976

[54] METHOD OF MANUFACTURING AN OPTICAL FIBRE LIGHT WAVEGUIDE

[75] Inventor: Richard Burnaby Dyott, London, England

[73] Assignee: The Post Office, London, England

[22] Filed: Nov. 19, 1973

[21] Appl. No.: 417,045

[52] U.S. Cl. ............... 350/96; 350/96 BC; 65/3; 65/4; 65/DIG. 7
[51] Int. Cl.² ............... G02B 5/14; C03C 25/02; C03C 23/20
[58] Field of Search ............ 65/DIG. 7, 4, 4 A, 3 A; 350/96 WG, 96 BC

[56] References Cited
UNITED STATES PATENTS

| | | | |
|---|---|---|---|
| 2,825,260 | 3/1958 | O'Brien | 65/4 X |
| 3,278,283 | 10/1966 | Bazinet, Jr. | 65/4 |
| 3,387,959 | 6/1968 | Cole | 65/4 |
| 3,505,046 | 4/1970 | Phaneuf | 65/4 X |
| 3,535,017 | 10/1970 | Miller | 65/DIG. 7 |
| 3,615,313 | 10/1971 | Phaneuf | 65/DIG. 7 |
| 3,677,730 | 7/1972 | Deradoorian et al. | 65/DIG. 7 |

FOREIGN PATENTS OR APPLICATIONS 1,245,891  9/1971  United Kingdom

Primary Examiner—Robert L. Lindsay, Jr.
Assistant Examiner—Frank W. Miga
Attorney, Agent, or Firm—Kemon, Palmer & Estabrook

[57] ABSTRACT

A dielectric optical waveguide can be made by forming a bundle of rods in which a single rod made of glass suitable for forming the core of the dielectric optical waveguide is surrounded by three rods made of a glass suitable for forming the cladding of the dielectric optical waveguide. The bundle of rods is heated and drawn down to a suitable size. By increasing the number of rods in the bundle it is possible to make a dielectric optical waveguide with a plurality of cores.

4 Claims, 4 Drawing Figures

METHOD OF MANUFACTURING AN OPTICAL FIBRE LIGHT WAVEGUIDE

The present invention relates to dielectric optical waveguides and methods of making dielectric optical waveguides.

The terms "optical" and "light" as herein used are to be understood as extending to those regions of the electro-magnetic spectrum more usually designated as the infra-red, visible, and ultra-violet.

The term "triangular" as herein used is intended to cover geometric structures having straight line sides, and geometric structures having curved sides, a side being defined as a line having a radius of curvature, bounded at its ends by regions of smaller radius of curvature or by discontinuities in the radius of curvature.

One of the most frequently used methods of making dielectric optical waveguides, is to position a glass rod of one composition inside a glass tube of another composition, and to draw the composite tube out until its dimensions are such that it will behave as a dielectric optical waveguide. The chief disadvantages with this technique is the difficulty encountered in completely removing dust and dirt from the inside of the tube.

It is an object of the present invention to provide a method of drawing dielectric optical waveguide from glass rods, in which the need to clean the internal surface of a tube is avoided.

According to the present invention there is provided a method of making a triangular cored dielectric optical waveguide having at least one core of a first glass composition and a cladding of a second glass composition, the first glass composition having a higher refractive index than the second glass composition wherein a bundle of circular sectioned glass rods is formed, each of said rods having either said first or said second composition, said rods disposed so that there are three and only three rods of said second composition disposed immediately circumjacent each rod of said first composition; heating the bundle of rods to a temperature at which the glasses of said first and said second compositions are plastic and drawing said bundle of rods to produce a dielectric optical waveguide.

According to a second aspect of the present invention there is provided a dielectric optical waveguide made by the process set forth in the preceding paragraph.

The invention will now be described by way of example with reference to the embodiments illustrated in the accompanying diagrammatic drawings in which.

Figure 1:
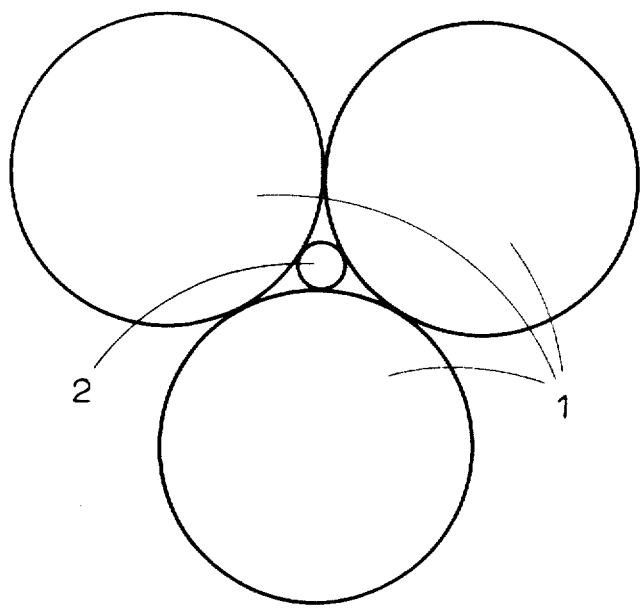
FIG. 1 shows a cross-section through a bundle of fibres prior to the drawings operation.

Referring now to the drawings, FIG. 1 shows the arrangement of rods, from which a triangular cored dielectric waveguide is drawn. The rods 1 are made up of a glass with a lower refractive index than the core rod 2. The rods 1 may be made of pure vitreous silica, and the rods 2 of vitreous silica doped with a suitable metal oxide e.g. titanium dioxide. Other materials may of course be used for the rods 1 and the core rod 2. The only limitation imposed on the materials is that they should have similar coefficients of expansion, so that excessive stress is not produced in the fabricated dielectric optical waveguide, also the temperatures at which the materials soften should not be too different.

Figure 2:
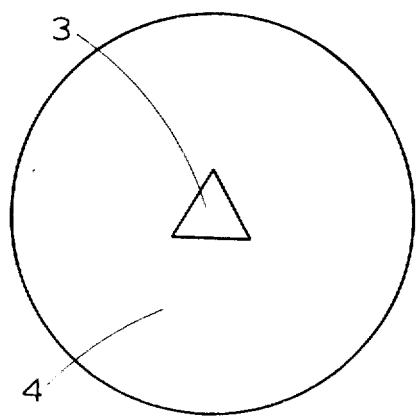
FIG. 2 shows a cross-section through a dielectric optical waveguide with a triangular core.

The rod assembly shown in FIG. 1 is heated until the rods 1 and 2 are plastic, and then drawn using a conventional fibre drawing apparatus until the resultant fibre has dimensions suitable to enable it to function as a dielectric optical waveguide. Preferably the fibre is so dimensioned that it will act as a monomode dielectric optical waveguide. Typically after drawing, the dielectric optical waveguide will have the section shown in FIG. 2 with a core 3 and cladding 4. The core is formed from the rods 2 and the cladding from the rods 1. The drawing operation should of course result in a fibre with a uniform cross-section along its length.

The dielectric optical waveguide discussed above has only one core, it is of course possible to make a dielectric optical waveguide having a plurality of cores using the technique just described. For example if it is desired to construct a dielectric optical waveguide having four cores, the configuration of rods shown in FIG. 4 may be used. The rods 1 form the cladding, and the rods 2 form the cores after the bundle of rods is drawn. The invention is of course applicable to dielectric optical waveguides having any number of cores. The arrangement of rods is characterised by having three rods of cladding glass arranged around each rod of core glass. Each rod of cladding glass may of course be contiguous to more than a single (up to 3) rods of core glass.

Figure 4:
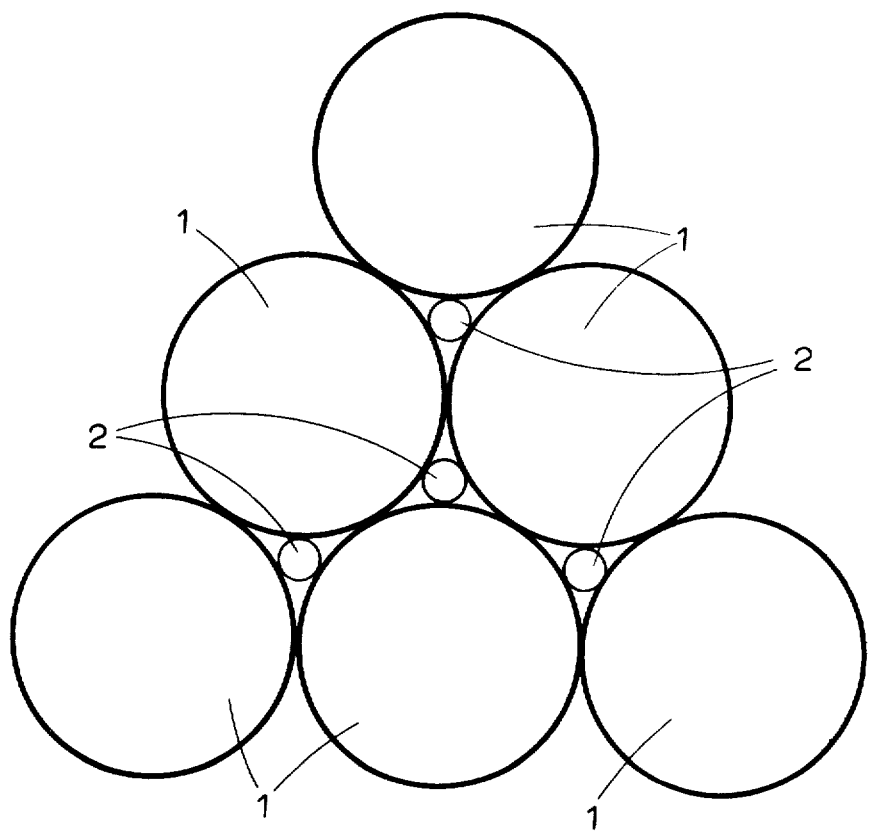
FIG. 4 shows a bundle of fibres prior to drawing into a multi-cored dielectric optical waveguide.

In both FIG. 1 and FIG. 4 the rods from which the dielectric optical waveguide is subsequently drawn are shown mutually contiguous. However some variations in dimensions can be tolerated so that the rods are no longer contiguous. However because of the natural stability of a structure comprising three inwardly biased circular cylinders, it is advantageous, though not essential, if the core rods 1 are mutually contiguous.

The ratio between the side length, $a$ of the triangular core and the overall radius, R of the dielectric optical waveguide may be calculated if it is assumed that all the rods used in making the waveguide just touch prior to the drawing and the ratio of cross sectional areas of the rods 1 to the core rod 2 are the same as the ratio of cross sectional areas of the cladding 4 to the core 3 after drawing.

If $R_1$ is the radius of rod 2 and $R_2$ is the radius of rods 1 all of which have the same diameter, then $$R_1 = R_2 \left[\frac{2}{\sqrt{3}} - 1\right] = 0.1547 R_2 \qquad (1)$$

Equating cross sectional areas before and after drawing gives $$\frac{R}{a} = \frac{3^{1/4}}{2\sqrt{\pi}} \left[\frac{3}{(2/\sqrt{3} - 1)^2} + 1\right]^{1/2} = 4.1732 \qquad (2)$$

Figure 3:
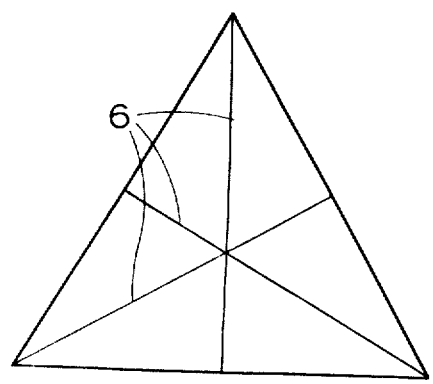
FIG. 3 shows the planes of polarisation of the fundamental mode in a triangular cored dielectric optical waveguide.

The method described above is a dielectric optical waveguide with a core having a cross section in the form of an equilateral triangle. Such waveguides support only one fundamental mode. This mode has three possible planes of polarisation, in the direction of lines 6, in FIG. 3. Thus if the waveguides can be so dimensioned that only the fundamental modes can propagate there will be no dispersion due to different modes propagating with different group velocities.

It can be shown that the higher mode cut-off of a triangular cored dielectric optical waveguide is given approximately by the equation:

$$\frac{a}{\lambda_o}\left[n_1^2 - n_2^2\right]^{1/2} = 1 \qquad (3)$$

Where $a$ is the side of the triangle, $\lambda_0$ is the higher mode cut-off wavelength, $n_1$ is the core refractive index and, $n_2$ is the cladding refractive index. Considerable assumptions and approximations have to be made in the derivation of equation 3.

Typical dimensions for a triangular cored waveguide using a core of refractive index 1.5198 and cladding of refractive index 1.50, operating at a wavelength of 0.6328 microns are, $a = 2.58$ microns and $R = 21.6$ microns.

What we claim is:

1. A method of making a monomode dielectric optical waveguide having at least one core of triangular cross-section of a first glass composition and a cladding of a second glass composition, the refractive index of the glass of said core being higher than that of the glass of said cladding, the steps comprising:

a. forming a bundle consisting of circular cross-section cladding rods of equal diameter in integral multiples of three with all rods parallel and the rods in each group of three in peripheral contact with the other two, with a core rod of circular cross-section arranged in the space defined between each group of three cladding rods and sized so as to be in peripheral contact with each surrounding cladding rod;

b. heating said bundle to a temperature at which the glasses of both said first and second compositions are plastic; and c. drawing said bundle down by an amount sufficient to produce a triangular cross-section of said core rods and a circular cross-section of the drawn bundle.

2. A method of making a triangular cored dielectric optical waveguide as claimed in claim 1 wherein said bundle of rods comprises a single rod of said first composition and three rods of said second composition.

3. A method of making a triangular cored dielectric optical waveguide as claimed in claim 1 wherein said bundle of rods includes a plurality of rods of said first composition.

4. A dielectric optical waveguide made by the process claimed in claim 1.

* * * * *

UNITED STATES PATENT OFFICE
CERTIFICATE OF CORRECTION

PATENT NO. : 3,930,714
DATED : January 6, 1976
INVENTOR(S) : RICHARD BURNABY DYOTT It is certified that error appears in the above-identified patent and that said Letters Patent are hereby corrected as shown below:

--[30]   Foreign Application Priority Data
         Nov. 24, 1972   Great Britain........54413/72--

Signed and Sealed this eleventh Day of May 1976

[SEAL]

Attest:

RUTH C. MASON
*Attesting Officer*

C. MARSHALL DANN
*Commissioner of Patents and Trademarks*